Patented May 8, 1945

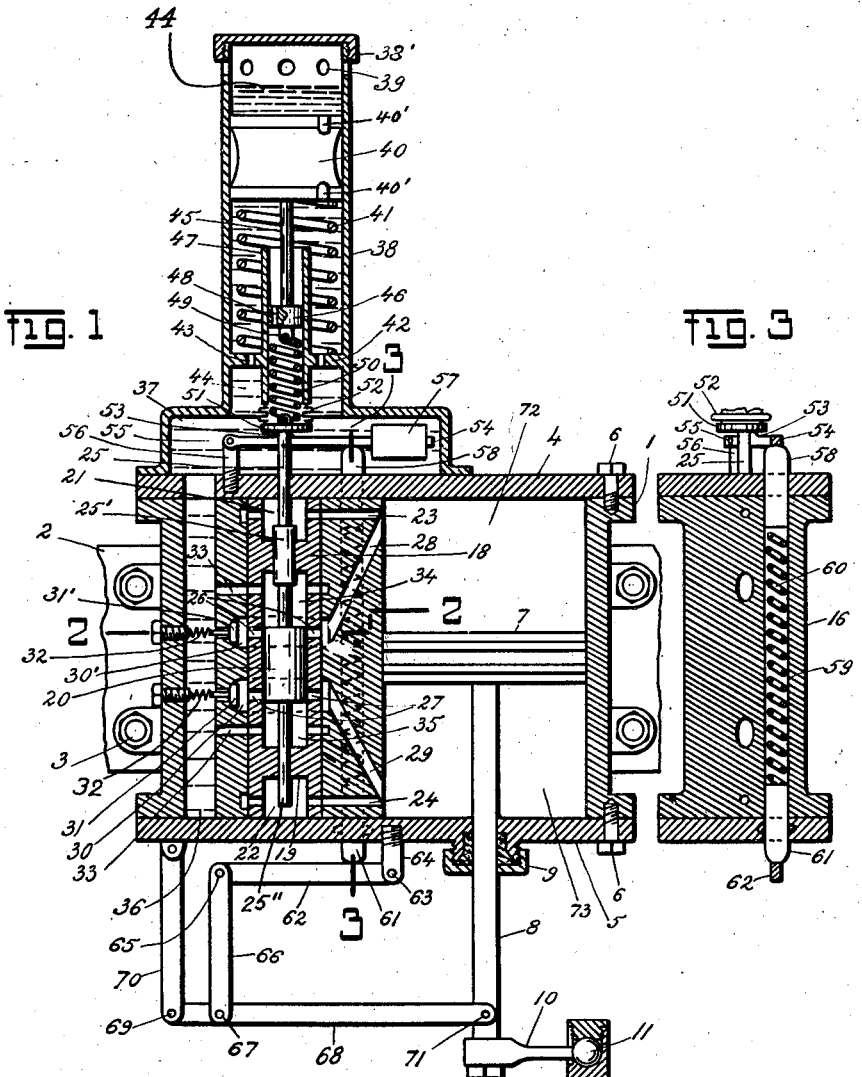

2,375,377

UNITED STATES PATENT OFFICE 2,375,377

SHOCK ABSORBER

Sergei D. Mitereff, Petersburg, Va.

Application August 20, 1940, Serial No. 353,348

3 Claims. (Cl. 188—88)

My invention relates to shock absorbers and has particular reference to shock absorbers employing elastic or other fluid and adapted to be used with automotive vehicles, landing gears, trailers, etc.

In my U. S. Patent No. 2,212,426, issued August 20, 1940, I described one type of my improved shock absorber and stabilizer employing in its preferred form compressed air from a source external to the shock absorber, valves being provided for distributing the compressed air or other fluid in the shock absorber so as to inhibit the movements of the supported body with but little interference with the movements of the wheels and the axles.

My present invention has for its object to provide a shock absorber in which an incompressible liquid such as oil can be used, preferably stored in a reservoir at the shock absorber itself, and requiring no external supply of oil under pressure for its operation.

My present device is not limited, however, to such "passive" operation since it can also be adapted for operation with a fluid under pressure from a suitable source such as an enlarged lubricating pump of an automobile, inlet and drain connections being provided for this purpose in the suitable chambers of the device. No changes are required in the shock absorber itself for operation with oil under pressure with the exception of the necessary connections. The device is also operative without such an external supply of fluid, the "passive" operation being somewhat less efficient. Therefore, the use of oil under pressure for the operation of the present device is optional.

Moreover, the pilt and check valves of the shock absorber are so arranged as to minimize the consumption of oil under pressure, mainly to reduce the jerk due to sudden application of the stabilizing force during the rebound motion of the body of the automobile with "passive" operation of the device. The tension-compression spring is optionally used to connect the piston rod of the device with the axle of the vehicle.

Other objects and advantages of my invention will be apparent from the accompanying specification and drawing in which—

Fig. 1 is a sectional elevation of my shock absorber;

Fig. 2 is a sectional view taken on the line 2—2 of Fig. 1;

Fig. 3 is a sectional view taken on the line 3—3 of Fig. 1.

My shock absorber is shown in one of its preferred aforms in Figs. 1, 2 and 3. It consists of a cylindrical casing 1 attached to a frame 2 of a vehicle by bolts 3 and having covers 4 and 5 fastened by bolts 6. A piston or plunger 7 slides in the cylinder and has a rod 8 sliding in a sealing gland 9.

The other end of the rod has an arm 10 with a ball 11 pivotally clamped in a connecting bar 12. The other end of the bar 12 has a socket for a ball 13 on the end of an arm 14 attached to an axle 15 of the vehicle. The piston rod 8 is connected with the axle 15 also by means of the tension-compression spring 210. The spring 210 is inoperative as long as the bar 12 is in place. Should the bar 12 be removed, the spring 210 will then permit a somewhat altered and better operation of the device in stabilizing the body of the vehicle, in a manner to be explained later. For convenience the vehicle may be defined as a body resiliently supported on a member, such as the axles with wheels, contacting a supporting medium such as a road surface. The cylinder is filled with a liquid such as oil, mixture of glycerine and alcohol, etc. The cylinder and plunger act as a shock absorber for stabilizing the movements of the body. My mechanism differs, however, from ordinary shock absorbers in that the liquid in the cylinder is in communication with an external supply of the liquid under control of automatic valves so that the pressure difference on either side of the cylinder is positively controlled. In this respect the cylinder and the plunger represent a hydraulic device or force converter which changes the relative distribution of forces caused by the movements of the axle and body. It is evident, of course, that the cylinder and the plunger may be of any suitable shape including a rotary form as shown and described in my above mentioned patent.

The casing 1 has an extension 16 with a cylindrical bore for a sleeve 17. The latter has end walls 18 and 19 with bearings for the stem 25 of sliding valve 20. Chambers 21 and 22 are formed at the ends of the sleeve 17 and are connected with the cylinder bore by ducts 23 and 24. The stem 25 of the valve 20 has an enlarged portion 25' at the top where it passes through the wall 18, the area of the shoulder of the enlarged portion being equal to the area of the lower end 25" of stem 25 passing through partition 19. The valve 20 closes with slight overlap on its inner sides in its neutral position ports 26 and 27 which are in communication with the upper and lower portions of the cylinder bore by means of ducts 28 and 29. The ducts terminate at a certain distance from the covers 4 and 5 in order to provide a liquid cushion for the piston at the end of its travel.

These ports are also in communication with annular chambers 30 and 30' closed by check valves 31 and 31' under tension of springs 32. Additional ducts 33 connect the chambers 34 and 35 with a chamber 36 which is in communication with a casing 37 on top of the cylinder housing 1. A relatively tall tube 38 extends from the casing 37 and is closed on top with a cap 38', vent holes 39 being provided under the cap. A cylindrical weight 40 slides in the tube, being supported by a spring 41 resting on a horizontal wall 42. Holes 43 are provided in the wall 42 for oil or similar liquid in chamber 44 which fills part of the tube 38, casing 37, chamber 36, chambers 34 and 35, and the cylinder 1. The weight 40 has a rod 45 with a plunger 46 sliding in a smaller tube 47 fitted centrally in the wall 42. The plunger has a hole 48 for the oil and is attached at 49 to the upper end of a helical spring 50 whose other end is attached to a plate 51 on the upper end of the valve stem 25. The plate 51 is connected by bellows 52 with the lower end of the inner tube so that the weight 40 can move the valve 20 up or down through the spring 50. The plate 51 rests on a lug 53 on an arm 54 pivoted at 55 to a post 56 and having a weight 57 at the other end. The arm 54 rests on a plunger rod 58 sliding in a bore 59 in the body of the casing extension 16 and supported on a spring 60. The other end of the spring 60 rests on a lower sliding plunger rod 61 supported by a link 62 pivoted at 63 to a post 64 on the cover 5. Its other end is pivoted at 65 to one end of a vertical link 66 pivoted at 67 to a lever 68. The latter is pivotally supported at 69 on a post 70 extending from the cover 5, the other end being pivoted at 71 to the rod 8. Under normal conditions when the vehicle is standing still or is moving on a smooth surface, the valve 20 remains in its neutral position, and the weight 40 remains in the equilibrium on the spring 41. The weight 40 may be provided with slots 40' to facilitate its movement in the oil below the level.

Upon upward movement of axle 15 when the vehicle wheel strikes an obstruction, piston 7 is moved upward (through link 12) and forces liquid through passage 23 against shoulder member 25', lowering valve 25', 25, 20, opening passage 28, 26, 34, 33 so that the axle 15 and piston 7 move upward without appreciable resistance. Spring 60 will be compressed by upward movement of axle 15, through linkage 68, 66, 62 and this will increase the pressure in chambers 72, 21 necessary to lower valve stem 25, in proportion to the relative distance the axle 15 moves upwardly with respect to frame 2. Check valve 31 allows liquid to flow through passages 30, 29 to fill space beneath piston. When the vehicle chassis frame 2 moves upwardly due to expansion of the momentarily compressed vehicle springs, inertia weights 57 and 40 will move downwardly relative to tube 38. Weight 57 will move downwardly rapidly, against the action of spring 60, which is then compressed by linkage 68, 66, 62 in proportion to the distance axle 15 has moved upwardly and will relieve upward pressure on plate 51. Weight 40 will move down slowly because its movement is retarded by dashpot 47, 48. Rebound movement of axle 15 is therefore retarded because weight 40 will be slowed by dashpot 47, 48 in returning to its upward position relative to tube 38, thus yieldably holding valve member 25, 25', 20 in its downward position so that a pressure will be necessary in chamber 73 in order to raise valve member 25, 25', 20 by pressure of the liquid on the lower end thereof. As the chassis 2, however, follows the axle on rebound, weight 57 will tend to rise relative to tube 38 and thus aid the upward movement of valve member 25, 25', 20 to the position where pressure in chamber 73 is relieved through passages 29, 27, 33. Spring 60 will aid in this movement of weight 57. Check valve 31' will allow liquid to flow into chamber 72 through passages 26, 28, upon rebound. If piston 7 should travel past neutral on its rebound stroke the second rebound or return to neutral will again be initially opposed since the dashpot controlled weight 40 will lag in its upper position and thus necessitate a greater pressure in chambers 72, 21 to lower valve stem 25. Thus the initial upward movement of piston 7 is not appreciably checked but an increased checking action occurs as upward movement of piston 7 increases relative to casing 1. Initial downward or rebound movement of piston 7 is checked and this checking action is relieved as the rebound progresses. Any second or more rebound movement will be initially checked and then relieved as in the first rebound.

The relatively weak tension-compression spring 50 under the plunger 46 will exert a downward pressure on the bottom of the tube or on the plate 51, this force or pressure being proportional to the absolute vertical displacements of the body of the vehicle. At the same time the weight 57 will produce a downward reaction force proportional to the vertical absolute acceleration of the body in space. This force will affect the thrust on the plate 51. If the movements of the weight 40 are strongly damped by friction of surrounding oil, the relative displacement of the weight 40 in respect to the tube 38 will be small and it will be closely proportional to the absolute vertical velocity of the vehicle's body, existing at the moment under consideration. This is because with strong liquid viscose resistance, the weight 40 will move in space almost the same distance as traversed by the body of the vehicle. Therefore, the acceleration of the weight 40 will be very nearly equal to the acceleration of the body. The tension of the long supporting spring 41 varying but little, and the resistance of the plunger 46 and the spring 50 being small, the acceleration reaction of the weight 40 will be balanced only by the resistance of oil passing from one side of the weight 40 to another through holes 43, and through slots 40'. This liquid friction resistance force of pressure is proportional to the acceleration of the weight 40 in respect to the tube 38. Therefore, the magnitude of the relative displacement between the weight 40 and the tube 38 will be proportional to the acceleration of the weight 40 and for that matter of the body in space.

The change of tension of the spring 50 will be proportional to the relative displacement of the weight 40 or to the absolute velocity of the body of the vehicle as was just explained.

With strong damping of the weight 40, the pressure of the oil under the plunger 46, effective on the plate 51, will be proportional to the acceleration of the body of the vehicle, because it will be proportional to the velocity of the relative displacement between the weight 40 and the tube 38, while as just was explained, the relative displacement is proportional in this case to the absolute velocity of the body of the vehicle in space.

As before, the reactive force of the weight 57 will be proportional to the acceleration of the body.

Neglecting for the moment the change of tension of the spring 60, it will be seen from the above description that the plate 51 is subjected to the forces of inclination regardless of the degree of damping of the weight 40.

In addition, with small damping of the weight 40, a third force acting on plate 51, nearly proportional to the vertical displacement of the body, will be imposed by the changing tension of the spring 50.

Therefore, with the assumed upward acceleration the plate 51 and the valve discs 20 and 20' will be moved downwards overlapping and opening ports 27 and 26. Since at the beginning of upward impact due to a raised spot on the road, the axle 15 and piston move upwards faster than the body, the oil in chamber 72 will be compressed by the piston 7 but no appreciable pressure can be built in chamber 72 because oil is free to escape from it through ports 28, 26, bore 34, and port 33 into low pressure chamber 36.

At the same time no vacuum can be formed behind the receding piston in the chamber 73 because oil will be admitted from chamber 36 through check valve 31, circular chamber 30 and the port 29.

As soon as the raised spot on the road surface begins to decline, the piston 7 will start to lag behind the body which is still moving upwards as the result of original impact. The oil in the chamber 73 will now be compressed but it cannot escape from it as long as valve disc 20 is in downward position since check valve 31 prevents the reverse flow.

However, as soon as pressure in the chamber 73 is built sufficiently high it will move valve 20 upwards by acting on the lower plunger 25" through port 24 and bore 22, thus permitting oil in the chamber 73 to escape into space 36 through duct 29, ducts 27, bore 35 and duct 33.

It will be clear that in order to move valve 20 upward in opposition to downward forces acting on the plate 51 proportional to the acceleration of the body, the pressure in the chamber 73 will have to be also proportional to the acceleration of the body.

Thus the acceleration component will have the effect of increasing the mass of the body, thus lengthening its natural period of oscillation.

The use of the rigid link 12 connecting the axle 15 with the piston rod 8 has the disadvantage of a rather sudden application of the full value of the stabilizing force at the moment the piston 7 starts to lag behind the body during the initial upward or downward disturbance of the body due to either a raised or depressed spot on the road respectively.

This may produce more or less severe jolt to the passengers, but this disadvantage can be overcome by substituting tension-compression spring 210 connecting the axle 15 with the rod 8 for the link 12, which softens this jolt.

The weight 57 represents an inertia component of the system. It is supported on the spring 60 which is in turn supported on the axle 15 through the links 62, 66 and 68. The object of this arrangement is to increase the average oil pressure in chamber 72 at greater deflection of the suspension springs of the vehicle by the additional upward force acting on stem 25 generated by the compression of spring 60 as one piston 7 is moved upward.

It is understood that my shock absorber may be further modified without departing from the spirit of my invention as set forth in the appended claims.

I claim as my invention:

1. A shock absorber for a body resiliently supported on a member contacting a supporting medium, the body and the member being adapted to have a motion of translation over the supporting medium, a cylinder, a plunger slidably fitted in the cylinder, the plunger and the cylinder being connected to the body and to the member for relative movement therebetween, the cylinder being adapted to contain a liquid, a yieldably supported movable inertia element dampened by fluid friction responsive to dynamic properties of the vertical movements of the body, a source of the liquid for the cylinder, a valve capable of restraining the flow of the liquid from the cylinder, means to operate the valve by the said inertia element, pressure-controlled portions on the plunger acted upon by the differential pressure across the plunger to oppose the flow restraining action of said valve, and check valves for admitting the liquid from the source into the cylinder back of the moving plunger.

2. A shock absorber for a body resiliently supported on a member contacting a supporting medium, the body and the member being adapted to have a motion of translation over the supporting medium, a cylinder, a plunger slidably fitted in the cylinder, the plunger and the cylinder being connected to the body and to the member for relative movement therebetween, the cylinder being adapted to contain a liquid, a source of the liquid for the cylinder, a valve controlling the movement of the liquid between its source and the cylinder, means to move the valve by the pressure in the cylinder in front of the advancing piston for opening the communication between the cylinder in front of the piston and the source of the liquid for releasing the pressure in front of the piston, check valves for admitting the liquid from the source into the cylinder back of the plunger, and supplementary means to actuate the first said valve in proportion to the movement of the plunger in respect to the cylinder.

3. A shock absorber for a body resiliently supported on a member contacting a supporting medium, the body and the member being adapted to have a motion of translation over the supporting medium, a cylinder, a plunger slidably fitted in the cylinder, the plunger and the cylinder being connected to the body and to the member for relative movement therebetween, the cylinder being adapted to contain a liquid, a movable dampened inertia element responsive to dynamic properties of the vertical movements of the body, a source of the liquid for the cylinder, a valve controlling the flow of the liquid from the source to the cylinder, means to operate the valve by the said inertia element, and by the pressure in the cylinder in front of the advancing piston, and a check valve to admit liquid into the cylinder head of the plunger.

SERGEI D. MITEREFF.